(12) United States Patent
Mayer et al.

(10) Patent No.: US 8,585,888 B2
(45) Date of Patent: Nov. 19, 2013

(54) COPPER-BASED WATER OXIDATION CATALYSTS

(75) Inventors: James M. Mayer, Kenmore, WA (US); Shoshanna M. Barnett, Seattle, WA (US); Karen I. Goldberg, Seattle, WA (US); Bobby J. Portis, II, Jackson, MS (US)

(73) Assignee: University of Washington through its Center for Commercialization, Seattle, WA (US)

( * ) Notice: Subject to any disclaimer, the term of this patent is extended or adjusted under 35 U.S.C. 154(b) by 0 days.

(21) Appl. No.: 13/281,292

(22) Filed: Oct. 25, 2011

(65) Prior Publication Data

US 2012/0097551 A1    Apr. 26, 2012

Related U.S. Application Data

(60) Provisional application No. 61/406,211, filed on Oct. 25, 2010.

(51) Int. Cl.
*C02F 1/469* (2006.01)

(52) U.S. Cl.
USPC ........................................ 205/756; 204/290.1

(58) Field of Classification Search
USPC ................................................... 204/290.1
See application file for complete search history.

(56) References Cited

U.S. PATENT DOCUMENTS 5,948,223 A * 9/1999 Horikoshi et al. ......... 204/290.1

OTHER PUBLICATIONS

Waidmann, Christopher, "Slow Hydrogen Atom Transfer Reactions of Oxo- and Hydroxo-Vanadium Compounds: The Importance of Intrinsic Barriers", Mar. 17, 2009, J. Am. Chem. Soc., 131 (13), pp. 4729-4743.*
Shearer, Jason, "Substrate Oxidation by Copper-Dioxygen Adducts: Mechanistic Considerations", Mar. 26, 2005, J. Am. Chem. Soc., 127 (15), pp. 5469-5483.*
Jallabert, C. Molecular Oxygen Oxidation of Carbonyl Compounds by Di-μ-Hydroxo Homobinuclear Copper(II) Complexes.*
Elizarova, G.L., et al., "Homogeneous Catalysts for Dioxygen Evolution From Water. Oxidation of Water by Trisbipyridylruthenium(III) in the Presence of Metallophthalocyanines," Reaction Kinetics and Catalysis Letters 16 (2-3):285-288, Jun. 1981.
Elizarova, G.L., et al., "Homogeneous Catalysts for Dioxygen Evolution From Water. Water Oxidation by Trisbipyridylruthenium(III) in the Presence of Cobalt, Iron and Copper Complexes," Reaction Kinetics and Catalysis Letters 16 (2-3):191-194, Jun. 1981.

* cited by examiner

*Primary Examiner* — Keith Hendricks
*Assistant Examiner* — Timon Wanga
(74) *Attorney, Agent, or Firm* — Christensen O'Connor Johnson Kindness (57) ABSTRACT

Methods for electrolysis of water to oxygen gas are provided. The method utilizes dimeric copper cations in water at a basic pH. The cations are provided in the water by adding a complex in solid form with an appropriate anion, or through a "self-assembly" method whereby a copper salt and appropriate ligands are added to water adjusted to a basic pH. The cations decrease the overpotential of water electrolysis, thereby providing for efficient generations of oxygen gas using a catalyst formed from an abundant material (copper).

13 Claims, 8 Drawing Sheets

COPPER-BASED WATER OXIDATION CATALYSTS

CROSS-REFERENCE TO RELATED APPLICATION

This application claims the benefit of U.S. Provisional Application No. 61/406,211, filed Oct. 25, 2010, the disclosure of which is hereby expressly incorporated by reference in its entirety.

STATEMENT OF GOVERNMENT LICENSE RIGHTS

This invention was made with government support under grant CHE-0650456 awarded by the National Science Foundation. The government has certain rights in the invention.

BACKGROUND

Electrolytic water oxidation to dioxygen is a key challenge in the conversion of electricity to chemical fuels. This has been emphasized as part of electrochemical water splitting to make hydrogen ($H_2$). From a more general perspective, there is a growing need to convert electrical energy from renewable sources to stored chemical energy in the form of fuels. Fuels are reductants, so a clean and abundant source of electrons is required to make them. Water is the most logical source of those electrons because of its abundance and the benign nature of the by-product, $O_2$.

Water oxidation has become a very active area of research in recent years, inspired by energy challenges and by the emerging understanding of photosystem II. Metallic platinum and oxides/hydroxides of iridium, ruthenium, nickel, and other metals have long been used as anodes for this reaction, and recent discoveries of cobalt/phosphate and related catalysts have generated much interest. A variety of homogeneous catalysts and electrocatalysts for water oxidation have recently been reported, with a focus on Ru complexes but also including Ir, Mn, Co, and Fe compounds.

Despite the growing body of work on water oxidation catalysis, many substantial challenges remain in the development of an industrially viable catalyst, most notably cost, durability, and overpotential. Therefore, the discovery of a well-understood catalyst, particularly one based on inexpensive materials would be a significant advance.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, an electrocatalytic method for oxidizing water to provide oxygen gas is disclosed. In one embodiment, the method comprises applying a voltage across an anode and a cathode submerged in a solution comprising:

(a) water at a pH of 8 or greater; and
(b) an electrocatalyst comprising a cation:

$[Cu_2(\mu\text{-}OH)_2(L)_2]^{2+}$ wherein Cu is copper in a +2 oxidation state;
wherein μ-OH is an oxide ligand bridging the $Cu_2$;
wherein L is a polydentate nitrogen ligand bound to Cu; and (c) one or more anions X, wherein the total charge of the one or more anions X is −2.

In another aspect, a "self-assembly" method is provided that is an electrocatalytic method for oxidizing water to provide oxygen gas, comprising applying a voltage across an anode and a cathode submerged in a solution comprising Cu(II)X and L in water at a pH of 8 or greater, to provide an electrocatalytic solution, wherein X is one or more anions having a the total charge of −2. In this method, the electrocatalyst forms in situ from the copper salt (Cu(II)X) and ligand (L).

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Dimeric copper complexes are attractive targets for water oxidation because of their extensive biomimetic chemistry with O$_2$. Developed in part as models for copper O$_2$-activating enzymes, a variety of nitrogen-ligated copper(I) complexes react rapidly with O$_2$ to give L$_2$Cu$^{II}_2$(η$^2$:η$^2$-O$_2$) and [LCu$^{III}$(μ-O)]$_2$ complexes (FIG. 1; L=a bidentate or tridentate nitrogen-donor ligand). These complexes are typically stable only below −40° C., often decomposing to [LCu$^{II}$(μ-OH)]$_2$ complexes. In these systems, the peroxo and bis(μ-oxo) complexes are typically in rapid equilibrium even at low temperatures. There are very few other well-characterized examples of facile and reversible O—O bond formation and cleavage under mild conditions. Proton-coupled electron transfer (PCET) oxidation of a bis(μ-hydroxide) complex potentially yields a bis(μ-oxo) complex which can form an O—O bond and release dioxygen (FIG. 1).

Figure 1:
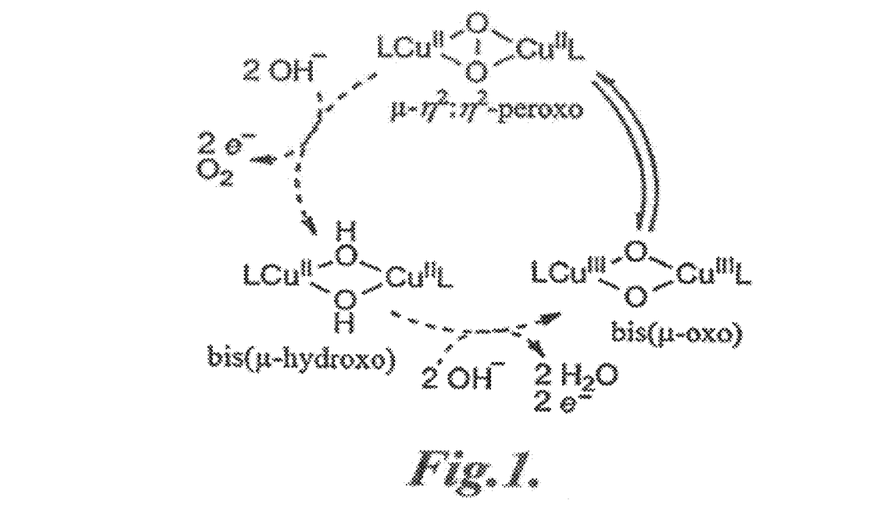
FIG. 1 is an equilibrium between the bis(μ-oxo) and μ-peroxo species has been observed below −40° C. in several copper systems (solid arrows). In these systems, the bis(μ-hydroxo) species is often observed as a decomposition product. The methods provided herein provide a proposed catalytic cycle for water oxidation based on this chemistry (dashed arrows), starting from the thermally stable bis(μ-hydroxo) species.

As disclosed herein, copper complexes having the form illustrated as the "bis(μ-hydroxo)" in FIG. 1 are utilized as electrocatalysts for oxidizing water to provide oxygen gas. The proposed mechanism is illustrated in FIG. 1, although the inventors do not wish to be bound by this theoretical construct. Use of the copper complexes significantly reduces the overpotential of the electrolysis reaction. Additionally, evidence suggests that the copper complexes are homogeneous catalysts that provide a high turnover rate (~100 s$^{-1}$). The copper complexes can be provided to the solution in a number of ways, two of which are specifically disclosed herein. First, an isolated salt incorporating the copper complex can be added to water. Second, the copper complex can be "self-assembled" in situ by adding a copper salt and the desired ligand separately to a basic water solution. The electrocatalyst self-assembles in the solution.

The specific embodiments of the catalytic methods will now be described in more detail.

In one aspect, an electrocatalytic method for oxidizing water to provide oxygen gas is disclosed. In one embodiment, the method comprises applying a voltage across an anode and a cathode submerged in a solution comprising:

(a) water at a pH of 8 or greater; and
(b) an electrocatalyst comprising a cation:

wherein Cu is copper in a +2 oxidation state;
wherein μ-OH is an oxide ligand bridging the Cu$_2$;
wherein L is a polydentate nitrogen ligand bound to Cu; and (c) one or more anions X, wherein the total charge of the one or more anions X is −2.

In the cation, a dimer of CuL is formed by two bridging hydroxide ligands, μ-OH, each of which independently bridges the two Cu atoms of the cation. The cation has a +2 charge and is soluble to at least 1 micromolar concentration in water. Without wishing to be bound by theory, it is believed that the dimer structure is as illustrated in FIG. 1 as "bis(μ-hydroxo)."

L is a polydentate nitrogen ligand that binds to Cu through the nitrogen atoms on L. Representative L include bidentate and tridentate ligands. Each L only binds to one Cu of the dimer cation, as illustrated in FIG. 1. L is resistant to oxidation, and is particularly resistant to the conditions under which the catalyst is used for the electrolysis of water. That is, L is not affected by the voltages applied during electrolysis, or by the basic conditions of the solution.

In one embodiment, L is selected from the group consisting of bipyridine, tripyridine, phenanthroline, and amine polydentate ligands that bind to copper.

In one embodiment, L is selected from the group consisting of 1,10-phenanthroline, 2,2'-dipyridyl methane, 2,2'-dipyridyl amine, 2,2',2"-tripyridyl amine, tris(2-pyridylmethyl) amine, ethylenediamine, diethylenediamine, EDTA (ethylene diamine tetracetic acid), 2,2'-bipyridine ligands and derivatives thereof, and 4,4'-Y$_2$-2,2'-bipyridines, where Y is a carboxyl anion, methyl, t-butyl, or methoxy, and derivatives thereof.

The two bridging ligands, μ-OH, form the Cu-based dimer in the solution. The dimer exists in basic conditions, which allows the μ-OH bridging ligands to form.

The one or more anions X have an overall charge of −2. That is, a single anion (e.g., sulfate) may have a −2 charge, or two anions at −1 (e.g., acetate) may balance the charge of the complex.

X is a species that allows the complex to be soluble in water to at least 1 micromolar concentration. That is, at least 1 micromolar solution can be formed when the complex is dissolved in water.

X can be any species that allows for the required solubility in water. X is also oxidation-resistant (i.e., it will not oxidize under the electrolysis conditions required to produce oxygen gas by the method).

In one embodiment, X is a carboxylate anion. In one embodiment, X is selected from the group consisting of acetate, triflate, sulfate, nitrate, tetrafluoroborate, and hexafluorophosphate.

The pH of the solution must be basic to allow the catalytic cycle to function. In one embodiment, the pH of the solution is greater than 10. In another embodiment, the pH of the solution is between 11 and 13. As illustrated by the exemplary data provided herein, representative electrocatalysts exhibit optimal performance (i.e., rapid rates and overpotential reduction) at relatively high solution pH, such as from 11 to 13.

An electrolyte is typically also added to the solution to increase conductivity. Representative electrolytes include NaX. However, it will be appreciated that any electrolyte can be used, as long as the catalyzed electrolysis of water is not negatively affected. Electrolyte concentrations typically range from about 0.1 M to about 1 M.

In one embodiment the cation has a concentration of from 1 micromolar to 1 molar.

In one embodiment, the electrocatalyst is a homogeneous catalyst. Experimental results, discussed below in Example 1, indicate that typical copper dimer catalyst cations are homogeneous catalysts in the provided solutions. However, some species may instead be heterogeneous catalysts (e.g., certain L groups may provide heterogeneous, instead of homogeneous, catalysts).

In one embodiment, the electrocatalyst is a solid material derived from the soluble copper cation in solution. Films comprising the electrocatalyst can be formed from the solutions described herein. These films can be used as electrocatalysts as well. Heterogeneous catalysts are beneficial because they allow less material to be used and for easier separations to be performed.

For example, cyclic voltammetry or electrolysis of $[(L)Cu(\mu\text{-OH})]_2^{2+}$ at reducing potentials greater than $-0.3$ V causes deposition of a heterogeneous catalyst. Heterogeneous catalysts can also be deposited from other kinds of copper solutions known to those of skill in the art, such as malic acid and copper sulfate.

In one embodiment, the electrocatalytic oxidation of water has an overpotential that is less than if no electrocatalyst is present in the solution. The primary purpose of the electrocatalysts, as used herein, is to reduce the overpotential required to produce oxygen gas through the electrolysis of water. Accordingly, the methods provided result in reduced overpotential when compared to a similar solution that contains no copper electrocatalyst.

The anode and cathode used to oxidize water in the solution can be any electrodes known to those of skill in the art. The voltage applied across the electrodes is sufficient to generate oxygen gas from the solution. Representative voltages are from 1.2 to 1.7 volts.

Another benefit of the electrocatalysts provided herein is that they provide a relatively fast turn-over frequencies of 100 s$^{-1}$. To the inventors' best information, this is the fastest reported turn-over frequency for a homogeneous catalyst.

The turn-over frequency is calculated using Equation 1.

$$i_c/i_p = 2.24 n_c n_p^{3/2} (k_{cat}RT)^{1/2} (Fv)^{-1/2} \quad (1)$$

Equation 1 is derived from the Randles-Sevcik Equation 2, which describes a reversible wave in cyclic voltammetry and the equation for the maximum current for the CV of an electrocatalyst (Equation 3). Equation 3 is specifically for a system under pure kinetic control, with no component of the current attributable to diffusion of the substrate (though diffusion of the catalyst will always be a component). By dividing the $i_c$ equation by the $i_p$ equation, many variables are eliminated from the resulting Equation 1.

$$i_p = 0.4463 n_p FAC_{cat}(n_p FvD/RT)^{1/2} \quad (2)$$

$$i_c = n_c FAC_{cat}(Dk_{cat})^{1/2} \quad (3)$$

In these equations:
$i_p$=maximum non-catalytic current
$i_c$=maximum catalytic current
$n_p$=number of electrons transferred in the non-catalytic event
$n_c$=number of electrons transferred in the catalytic event
F=Faraday constant
A=area of the electrode
$C_{cat}$=bulk concentration of the catalyst
v=scan rate
D=diffusion coefficient of the catalyst
R=ideal gas constant
T=temperature
$k_{cat}$=catalytic turnover frequency To use Equations 1-3, experimental conditions were found so as to be in the kinetic regime where $i_c$ is independent of scan rate and base concentration. The maximum catalytic current under these conditions was divided by the non-catalytic current at each scan rate and plotted vs. $v^{-1/2}$. The slope was substituted for $i_c i_p^{-1}/v^{-1/2}$, and then $k_{cat}$ was solved for.

The copper cation catalyst can be provided in the solution by any means known to those of skill in the art. One approach is to combine an "isolated catalyst" salt, containing the copper cation, with water. The synthesis of such isolated catalyst salts is known to those of skill in the art, as disclosed below in Example 1. Accordingly, in one embodiment, the electrocatalyst is provided by combining water with a complex:

$$[Cu_2(\mu\text{-OH})_2(L)_2]X$$

wherein the one or more anions X render the complex soluble in water to at least 1 micromolar concentration. The components of the isolated catalyst salt are the same as described above with regard to the cation.

In this embodiment, the components of the complex (L and X) are such that the complex is soluble in water to at least 1 micromolar. In one embodiment, complex is present in the solution at a concentration of from 1 micromolar to 1 molar.

In another aspect, a "self-assembly" method is provided that is an electrocatalytic method for oxidizing water to provide oxygen gas, comprising applying a voltage across an anode and a cathode submerged in a solution comprising Cu(II)X and L in water at a pH of 8 or greater, to provide an electrocatalytic solution, wherein X is one or more anions having a the total charge of $-2$. In this method, the electrocatalyst forms in situ from the copper salt (Cu(II)X) and ligand (L). Basic conditions in the water dimerize the CuL with $\mu$-OH bridging ligands. An electrolyte is typically added to the solution in this embodiment in similar composition and concentration as described above.

In one embodiment, the molar ratio of Cu(II)X to L is about 1 to 1. The ratio of Cu(II)X to L is from about 1:1000 to about 1000:1.

The X and L groups in this aspect are the same as those described above with regard to the copper dimer cation. While not wishing to be bound by theory, it is believed that the self-assembly method provided herein produces the copper dimer cation electrocatalyst. Accordingly, the X and L components, as well as the above-described benefits of the cation (e.g., reduction in overpotential), are equally applicable to the self-assembled approach.

The electrocatalytic properties of the electrocatalysts provided herein can be identified by using cyclic voltammetry (CV). Particularly, electrocatalysts will exhibit a large irreversible anodic wave during CV. The overpotential for oxidation of water is determined based on the half-peak potential $(E_{p/2})$ of CVs, as will be discussed in more detail in Example 1 below.

Data for exemplary catalysts is provided in Table 1. In Table 1, the ligand (L), the copper salt (X), and the concentrations of copper and the dimer cation are provided. Table 1 also indicates whether the dimer cation is provided to the solution by adding an isolated complex (e.g., $[(bpy)Cu(\mu\text{-OH})]_2(SO_4))$ or by generating the cation in situ, using the "self-assembly" method described herein, or both. If both methods of providing the cation were used, it can be seen that the results are the same. The pH-specific results are provided with regard to both the half-peak potential $(E_{p/2})$ and maximum current achieved during CVs of the catalytic solution.

TABLE 1

Experimental results of exemplary catalysts.

| Ligand | Copper salt | Concentration | Isolated or in situ | pH | $E_{P/2}$ (V vs. NHE) | Maximum current @ 100 mV/s |
|---|---|---|---|---|---|---|
| bpy | Cu(OAc)$_2$ | 1 mM Cu/0.5 mM dimer | both | 12.6 | 1.25 | 280 mA |
| bpy | Cu(OAc)2 | 1 mM Cu/0.5 mM dimer | both | 13 | 1.35 | 700 mA |
| bpy | Cu(OAc)2 | 0.1 mM Cu/0.05 mM dimer | both | 11.8 | 1.3 | 40 mA |
| bpy | Cu(SO4) | 1 mM Cu/0.5 mM dimer | isolated | 12.5 | 1.35 | 320 mA |
| bpy | Cu(OTf)2 | 1 mM Cu/0.5 mM dimer | isolated | 12.5 | 1.35 | 350 mA |
| MeO-bpy | Cu(OAc)2 | 1 mM Cu/0.5 mM dimer | in situ | 12.5 | 1.25 | 172 mA |
| MeO-bpy | Cu(OAc)2 | 0.1 mM Cu/0.05 mM dimer | in situ | 12.5 | 1.24 | 80 mA |
| $^-$OOC-bpy | Cu(OAc)2 | 0.1 mM Cu/0.05 mM dimer | in situ | 12.6 | 1.25 | 40 mA |
| $^t$Bu-bpy | Cu(OAc)2 | 1 mM Cu/0.5 mM dimer | in situ | 12.2 | 1.25 | 125 mA |
| Me-bpy | Cu(OAc)2 | 1 mM Cu/0.5 mM dimer | in situ | 12.2 | 1.3 | 190 mA |
| phenanthroline | Cu(OAc)2 | 0.1 mM Cu/0.05 mM dimer | in situ | 12.6 | 1.3 | 75 mA |
| Me$_2$-trispyradylamine | Cu(OAc)2 | 0.1 mM Cu/0.05 mM dimer | in situ | 12.4 | 1.3 | 65 mA |
| terpyridine | Cu(OAc)2 | 1 mM Cu/0.5 mM dimer | in situ | 12.2 | 1.6 | 130 mA |

The following example is for the purpose of illustrating, not limiting, the provided embodiments.

EXAMPLE

Example 1

Dimeric copper-bipyridine-bis(μ-hydroxo) complexes as electrocatalyst for water oxidation to oxygen gas Reported here are the first copper-based catalysts for electrolytic water oxidation to O$_2$. Dimeric copper-bipyridine-bis (μ-hydroxo) complexes [(bpy)Cu(μ-OH)]$_2$X$_2$ are electrocatalyst at pH 11.8-13.3 and ca. 750 mV overpotential. Cyclic voltammetry on glassy carbon and indium tin oxide (ITO) electrodes show large, irreversible currents, indicative of catalysis. The production of O$_2$ has been demonstrated both electrochemically and with a fluorescence probe during bulk electrolyses with ITO and reticulated vitreous carbon electrodes. The catalysts form rapidly in situ from commercially available materials and appear to be robust. Evidence points to a homogeneous catalytic species, versus a heterogeneous deposit. The electrochemical data suggest that these are among the most rapid homogeneous water oxidation catalysts, with turnover frequencies of 100 s$^{-1}$.

Methods

[(bpy)Cu(μ-OH)]$_2$X salts with X=two acetate or triflate anions, or X=sulfate anion, were prepared according to the method disclosed in: Harris, C. M., Sinn, E., Walker, W. R. & Woolliams, P. R. Nitrogenous chelate complexes of transition metals. V. Binuclear hydroxy-bridged copper(II) complexes of 1,10-phenanthroline and 2,2'-bipyridyl. *Aust. J. Chem.* 21, 631-640 (1968), the disclosure of which is incorporated herein by reference in its entirety.

The moderately soluble triflate and sulfate salts were isolated through precipitation by raising the pH to 11. The very soluble acetate salt was isolated by removal of solvent (water) in vacuo, followed by recrystallization from water. All three salts were characterized by elemental analysis and UV-vis spectroscopy. The acetate salt was also characterized by $^1$H NMR.

[(bpy)Cu(μ-OH)]$_2$(OAc)$_2$.4H$_2$O: $^1$H NMR (400 MHz, D$_2$O): δ 12 (s, 1H), 42 (s, 1H), 62 (s, 1H). UV/Vis $\lambda_{max}$ (ε) 617 nm (105 M$^{-1}$ cm$^{-1}$, neutral H$_2$O). Elemental analysis (calc., found for C$_{24}$H$_{32}$Cu$_2$N$_4$O$_{10}$): C (43.44, 43.40), H (4.86, 4.70), N (8.44, 8.36).

[(bpy)Cu(μ-OH)]$_2$(OTf)$_2$: UV/Vis $\lambda_{max}$ (ε) 617 nm (105 M$^{-1}$cm$^{-1}$, neutral H$_2$O). Elemental analysis (calc., found for C$_{22}$H$_{18}$Cu$_2$N$_4$O$_8$S$_2$): C (34.24, 34.10), H (2.35, 2.22), N (7.26, 7.17).

[(bpy)Cu(μ-OH)]$_2$(SO$_4$): UV/Vis $\lambda_{max}$ (ε) 617 nm (110 M$^{-1}$cm$^{-1}$, neutral H$_2$O). Elemental analysis (calc., found for C$_{20}$H$_{28}$Cu$_2$N$_4$O$_7$S$_1$): C (36.42, 36.63), H (4.28, 4.25), N (8.49, 8.54).

Electrochemistry was performed using a BASi Epsilon potentiostat. In all cases, a platinum auxiliary electrode and Ag/AgCl (saturated KCl) reference electrode were used. Electrochemical data were adjusted to NHE by adding 0.199 V to potential measurements. Solutions of 0.1 M electrolyte were prepared by titrating 0.1 M solutions of NaX (where X is the catalyst anion) with 0.1 M NaOH until the desired pH was reached. pH was measured with a Fisher Scientific Accumet pH meter. Cyclic voltammetry was performed using a 0.3 cm glassy carbon disk working electrode (from BASi) or an ITO electrode (from Delta Technologies) with the surface area restricted with electrical tape. Bulk electrolysis was performed in a custom-designed gas-tight cell using a reticulated vitreous carbon working electrode (from BASi) or a double-coated, unpolished ITO electrode (from Delta Technologies). Solutions used for bulk electrolysis were sparged with nitrogen. The dissolved oxygen concentration during bulk electrolysis was measured with an Ocean Optics FOXY fluorescence probe (http://www.oceanoptics.com/Products/neofox.asp).

Results and Discussion

The [(bpy)Cu([μ-OH)]$_2^{2+}$ cation spontaneously assembles from Cu(II) salts and bpy at alkaline pHs, and at lower pH, [(bpy)Cu(μ-OH)]$_2^{2+}$ protonates and dissociates to monomers.

Figure 2A:
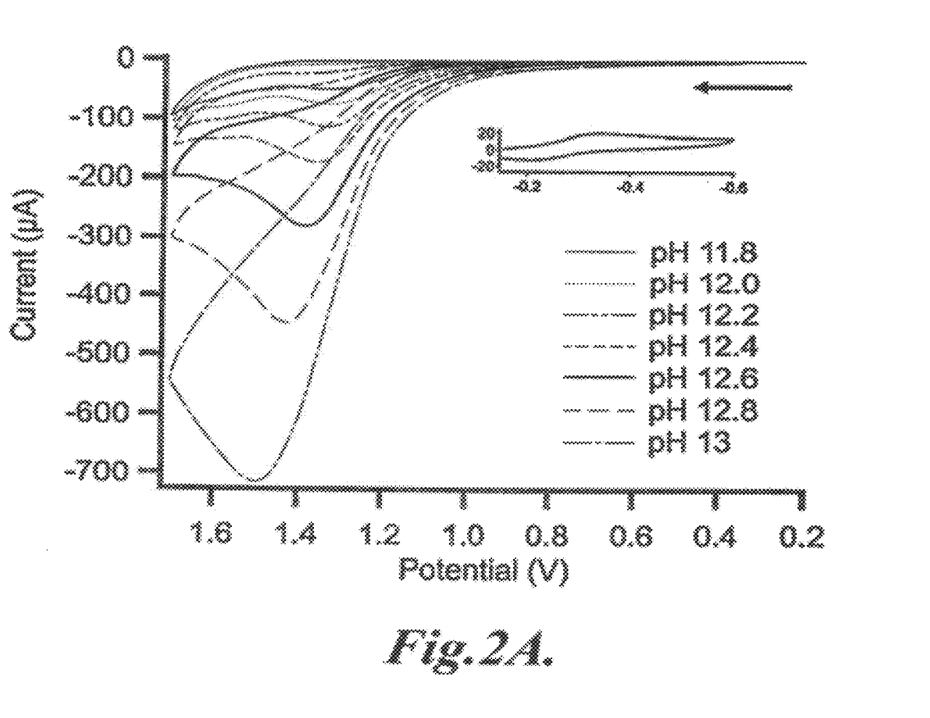
FIG. 2A is a set of cyclic voltammograms (CVs) of 0.5 mM [(bpy)Cu(μ-OH)]$_2$(OAc)$_2$ in 0.1 M aqueous electrolyte (NaOAc+NaOH), at 100 mV/s on a glassy carbon (GC) electrode, showing large, irreversible pH-dependent waves that indicate electrocatalysis. Inset: a CV of the same solution at pH 12.5 under nitrogen, shown at the same scale as the irreversible anodic wave.
Figure 2B:
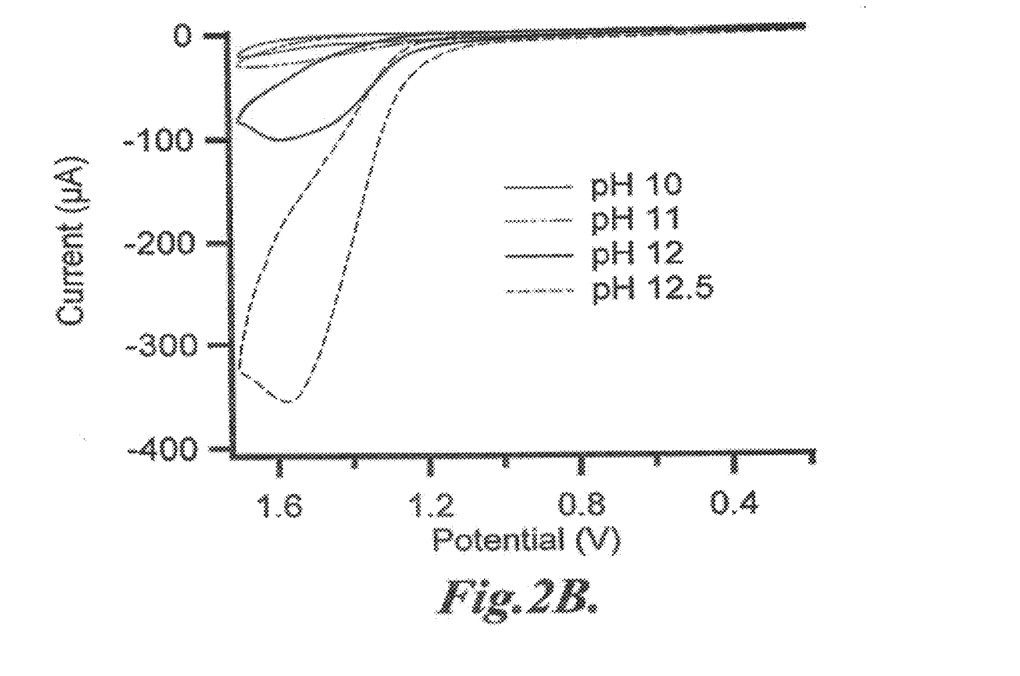
FIG. 2B is a set of cyclic voltammograms of 0.5 mM [(bpy)Cu(μ-OH)]$_2$(OTf)$_2$ at 100 mV/s using a glassy carbon working electrode in 0.1 M aqueous electrolyte (NaOTf+NaOH) at different pH values.
Figure 2C:
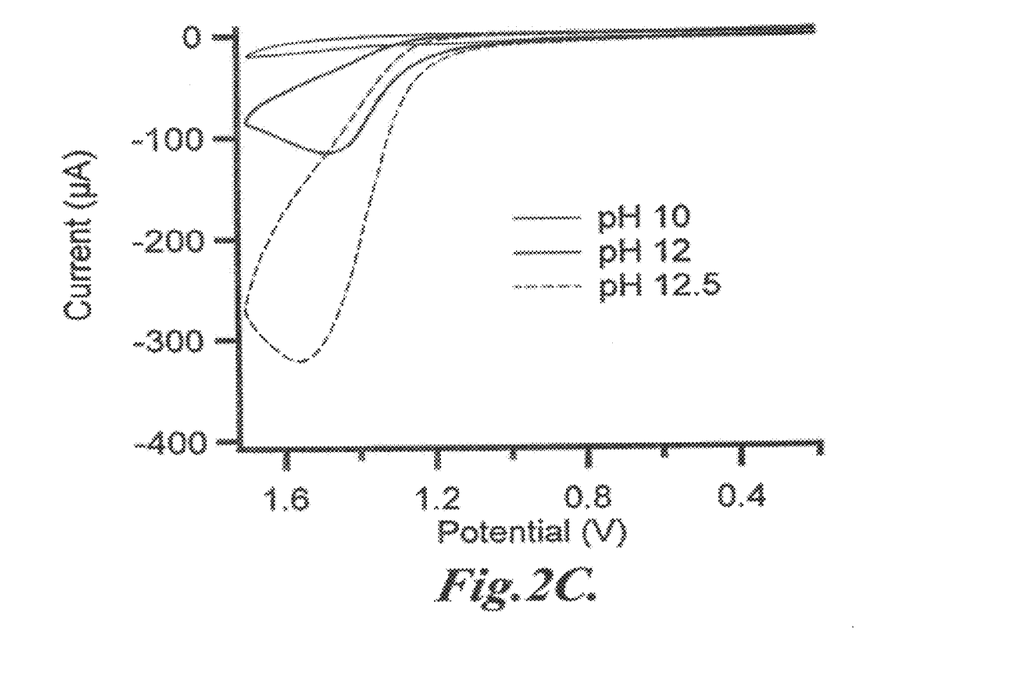
FIG. 2C is a set of cyclic voltammograms of 0.5 mM [(bpy)Cu(μ-OH)]$_2$(SO$_4$) at 100 mV/s using a glassy carbon working electrode in 0.1 M aqueous electrolyte (Na$_2$SO$_4$+NaOH) at different pH values (vs. NHE)
Figure 3:
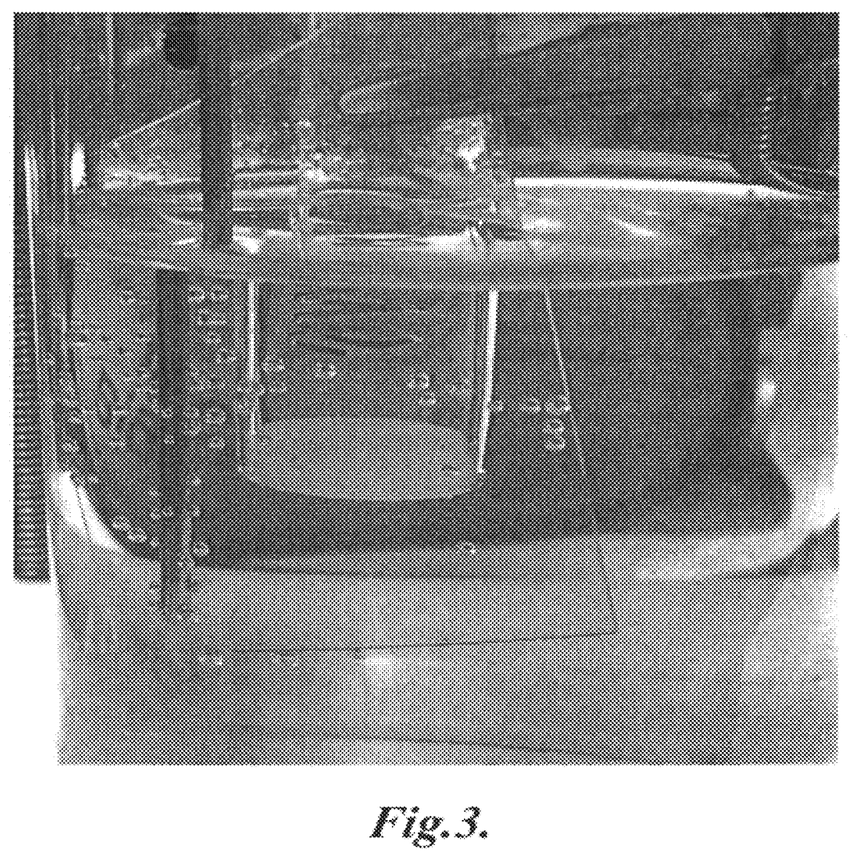
FIG. 3 is a photograph of an exemplary sample after controlled potential electrolysis (CPE) at 1.35 V for 30 min, oxygen bubbles form on a clear tin-doped indium oxide (ITO) electrode.

Cyclic voltammograms (CVs) of 0.5 mM basic aqueous solutions of three different water-soluble [(bpy)Cu(μ-OH)]$_2$X salts, with X=(OAc$^-$)$_2$, (OTf$^-$)$_2$, SO$_4^{2-}$, were obtained under air using both glassy carbon (GC) and tin-doped indium oxide (ITO) working electrodes. The electrolyte was prepared by mixing appropriate volumes of 0.1 M NaOH and 0.1 M NaX or Na$_2$SO$_4$; for X=OAc$^-$ or OTf$^-$. This produces a total electrolyte concentration of 0.1 M (NaX+ NaOH) at each pH. Potentials were measured vs. an Ag/AgCl reference electrode and are reported vs. NHE through the addition of 0.199 V to the measured potential. Upon scanning at 100 mV/s from 0.2 to +1.7 V, solutions of all three salts exhibit large, irreversible, pH-dependent oxidation waves at +1.3-1.5 V (FIGS. 2A-2C). At pH 12.8, for instance, the peak current is 325 μA at 100 mV/s In FIG. 2A. This wave is observed on both GC and ITO electrodes. Scanning these solutions initially in the cathodic direction shows a quasi-reversible reduction, with a much smaller peak current of 8 μA (FIG. 2A inset). This cathodic wave is tentatively assigned as the 1e$^-$ Cu$_2^{II}$/C$^I$Cu$^{II}$ couple, in part by its similarity in size to the wave for ferrocyanide under similar conditions. The much larger size of the irreversible anodic wave indicates electrocatalysis.

Figure 4A:
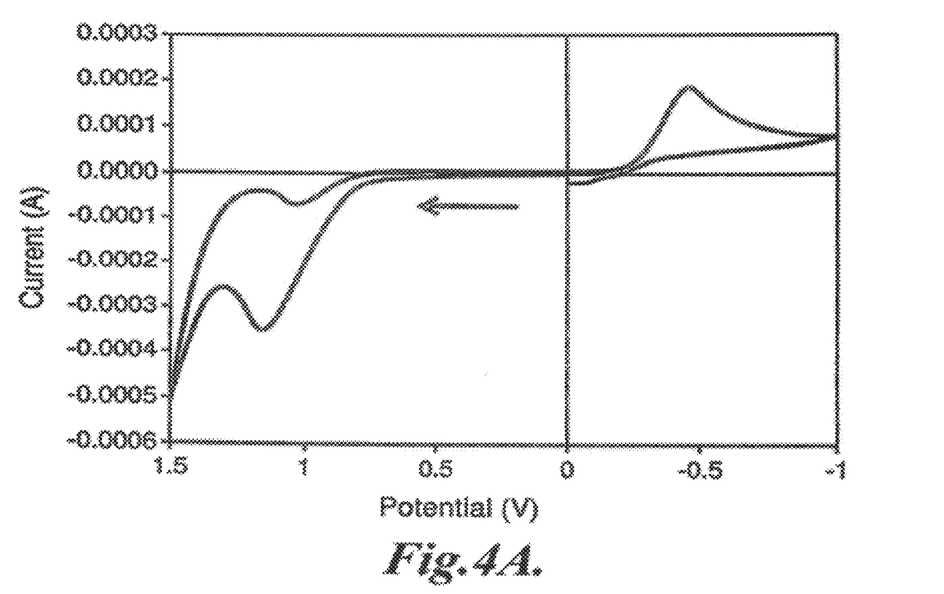
FIGS. 4A and 4B illustrate (4A) CV of 1 mM [Cu](OAc)$_2$ at pH 12.5 scanned to positive, then immediately to negative potentials. A large cathodic wave is observed at −0.5 V vs. Ag/AgCl that corresponds to oxygen reduction. (4B) Cyclic voltammogram using a glassy carbon working electrode in 0.1 M electrolyte (NaOAc+NaOH) at pH 12.5. The CV collected under air (solid line) shows a larger irreversible reduction of dioxygen at −0.2 V. When the solution is flushed with nitrogen, the wave becomes significantly smaller. It does not fully disappear due to incomplete sparging. Potentials are reported vs. Ag/AgCl.
Figure 4B:
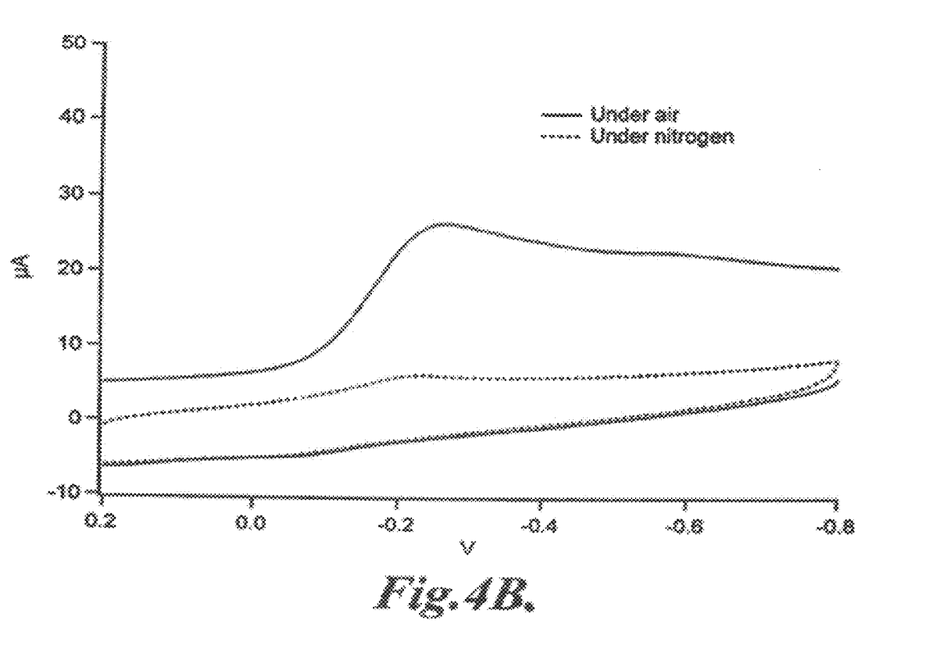

Over several scans, the formation of gas bubbles is observed on the electrode surface. If the electrode is cycled to cathodic potentials after scanning through the catalytic anodic wave, a large, irreversible peak is observed at −0.3 V (FIG. 4A). This peak is due to the O$_2$/O$_2^-$-couple, and thus indicates that the oxidative catalysis forms O$_2$. After the negative scan, bubbles are no longer observed at the electrode surface. The O$_2$/O$_2^-$-couple is not observed in CVs of solutions (with and without copper) that have been sparged with nitrogen (FIG. 2A inset, FIG. 4B) unless the electrode is first scanned to potentials where oxygen generation occurs.

Figure 5:
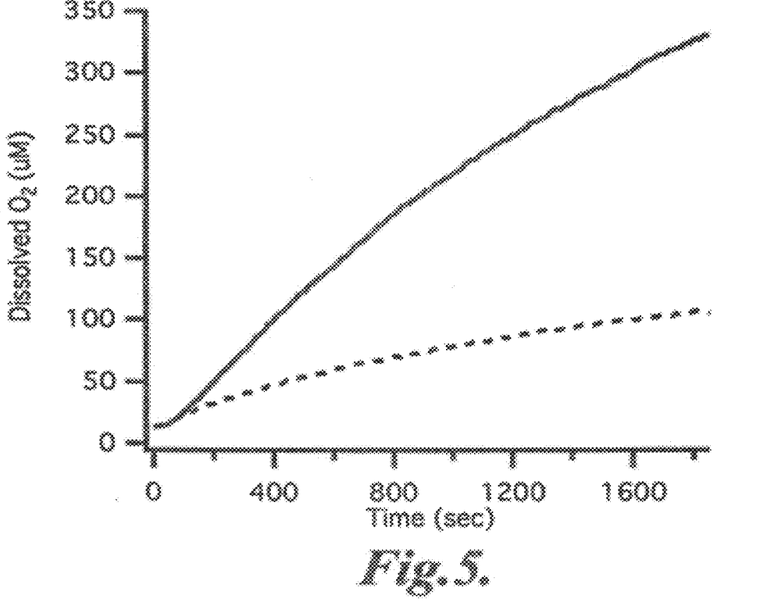
FIG. 5 is the oxygen evolution during bulk electrolysis using an ITO electrode at +1.35 V with 0.5 mM [(bpy)Cu(μ-OH)]$_2$(OAc)$_2$ (solid lines) or without copper (dashed). The Faradaic efficiency was 90%. All solutions contained 0.1 M electrolyte (0.1 M NaOAc titrated to pH 12.5 with 0.1 M NaOH.)

To further verify the evolution of oxygen and quantify it, the production of dioxygen was measured during controlled potential electrolysis (CPE) at +1.35 V on ITO. This experiment was performed in a gas-tight custom-designed cell with a stirred solution of 0.5 mM [(bpy)Cu(μ-OH)]$_2$(OAc)$_2$ in 0.1 M electrolyte (NaOAc+NaOH) at pH 12.5. O$_2$ formation in the solution phase was measured using a calibrated Ocean Optics FOXY probe. Over 30 minutes, the dissolved oxygen concentration rose from 10 μM to 330 μM (FIG. 5). This was compared to a control experiment, electrolysis in the absence of copper, in which only 110 μM of dissolved oxygen was present after 30 minutes (water is slowly oxidized by ITO at this potential and pH). A slight lag in the initial measured oxygen evolution is attributed to slow diffusion of oxygen to the probe and to the response time of the probe. A current density of 0.5 mA/cm$^2$ was maintained for the full 30 minutes of electrolysis, and a Faradaic efficiency of 90% was calculated based on a 4e$^-$ process. CPE was also performed in a small volume spectroelectrochemical cell for 5.5 hrs. Based on the above Faradaic efficiency, ~60 equivalents of O$_2$ were formed vs. the total concentration of [(bpy)Cu(μ-OH)]$_2^{2+}$ present in solution (while of course only the material close to the electrode surface is catalytically active). Optical spectra of the solution over the 5.5 hr experiment indicated about 35% decomposition of the catalyst, which is at least in part due to deposition of copper metal on the Pt auxiliary electrode in the same solution. Both of these experiments therefore indicate that the catalyst is robust.

Figure 6:
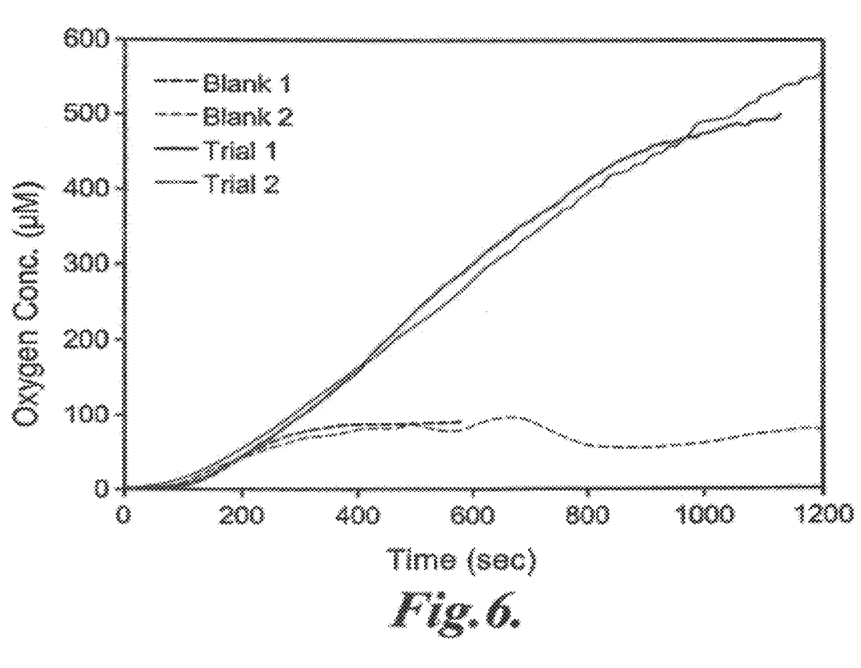
FIG. 6 illustrates dissolved dioxygen measured in 1 mM solution of [(bpy)Cu(μ-OH)]$_2$(OAc)$_2$ during electrolysis using a vitreous carbon electrode at 1.50 mV at pH 12.5. The Faradaic efficiencies were 34-45%.

CPE was also performed on a large, reticulated vitreous carbon electrode. This electrode appears to undergo significant oxidation at high potentials and high pH, leading to variable background currents. Still, electrolysis for 20 min at +1.5 V, under conditions similar to those above, generated substantial dioxygen (FIG. 6). In sum, the cyclic voltammetry and bulk electrolysis experiments both show that [(bpy)Cu ([μ-OH)]$_2^{2+}$ is an electrocatalyst for water oxidation to O$_2$.

The observation of electrocatalytic water oxidation by dicopper complexes is exciting, particularly because the large currents suggest rapid rates (see below). This oxidation occurs at an overpotential of ~750 mV, based on the half-peak potential (E$_{p/2}$) for CVs at pH 12.5 and 100 mV/s, and the reversible potential for O$_2$+4e$^-$+4H$^+$=2H$_2$O of 0.49 V at this pH.

The reported overpotentials are based on the E$_{p/2}$ values. These values are determined by calculating the first derivative of the CV data and finding the inflection point. The overpotential is taken as this measured potential minus the thermodynamic potential for the half reaction O$_2$+4e$^-$+4H$^+$→2H$_2$O, E=1.23 V−(0.059 V/pH)×pH. This overpotential is within the typical range for many homogeneous water oxidation catalysts (600-900 mV). Some of the better water-oxidation catalysts, such as IrO$_x$ nanoparticles and films, operate at 200-400 mV overpotentials and at similar current densities of ca. 0.5 mA/cm$^2$.

Catalytic copper solutions can be formed in situ as well as by using isolated [(bpy)Cu(μ-OH)]$_2$X$_2$. A number of the cyclic voltammetry experiments described above using isolated material have been repeated using 1:1 Cu(OAc)$_2$:bpy solutions adjusted to the appropriate pH, with identical results, indicating formation of the dimer copper complex. Optical spectra of solutions in NaOH/NaOAc are the same starting from isolated complex or from Cu(OAc)$_2$ and bpy.

The electrochemical properties of this system show a number of interesting features. The peaked shapes of the waves in FIGS. 2A-2C indicate that under those conditions, the electrocatalysis is affected both by substrate diffusion and by the kinetics of the catalytic reaction. Under purely kinetic conditions, when the current is limited only by catalysis, cyclic voltammograms are predicted to be S-shaped and reach a limiting catalytic current i$_c$. This kinetic limit is favored at slow scan rates and high substrate-to-catalysts ratios. Consistent with this analysis, CVs of [(bpy)Cu(μ-OH)]$_2$(OAc)$_2$ show S-shaped waves at very slow scan rates (≤10 mV/s) and low catalyst concentrations (≤50 μM). In this regime, the limiting catalytic current is given by Equation 4, where k$_{cat}$ is the effective first-order rate constant, C$_{cat}$ is the bulk catalyst concentration, n$_c$ is the number of electrons transferred (4), F is Faraday's constant, A is the area of the electrode, and D is the diffusion coefficient of the catalyst. It is often convenient to divide Equation 4 by the peak current in the absence of catalysis, which gives Equation 5 (in which n$_p$ is the number of electrons transferred in the non-catalytic wave).

$$i_c = n_c F A C_{cat} \sqrt{D k_{cat}} \tag{4}$$

$$\frac{i_c}{i_p} = 0.335 \frac{n_c}{n_p^{3/2}} C_{cat} \sqrt{k_{cat}/v} \tag{5}$$

Figure 7A:
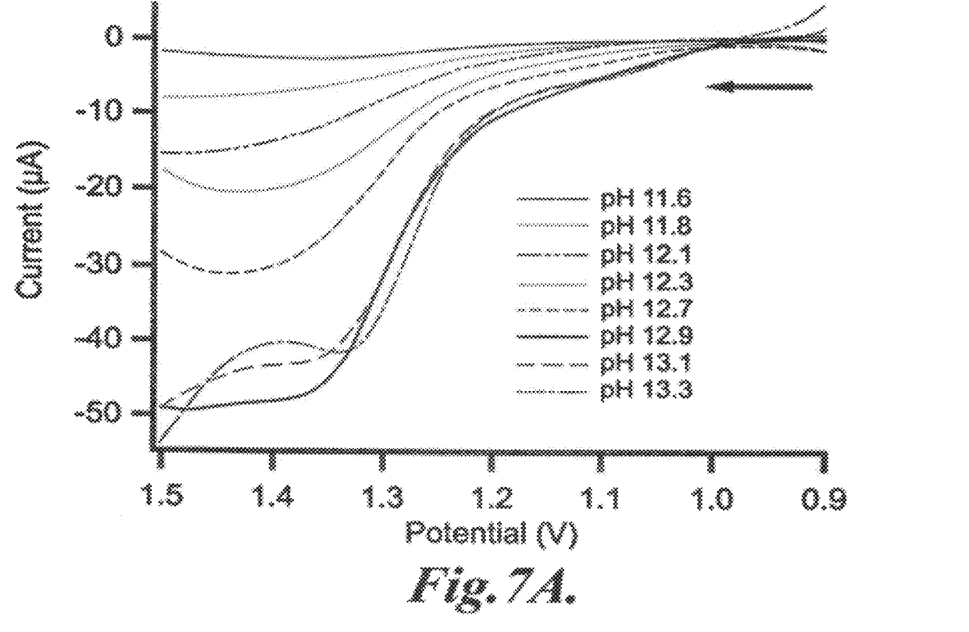
FIG. 7A illustrates background-corrected voltammograms of 50 μM [(bpy)Cu(μOH)]$_2$(OAc)$_2$ at various pH levels. At very high pH, the currents roughly plateau, rather than peak, and become independent of base concentration. Return waves are removed for clarity. The unusual shape of the pH 13.3 wave at high potential is due to the background correction. CVs were collected at 3 mV/s, with 0.1 M electrolyte (NaOAc+NaOH) and with the following electrodes: working, GC; reference, Ag/AgCl (adjusted to NHE); auxiliary, Pt.
Figure 7B:
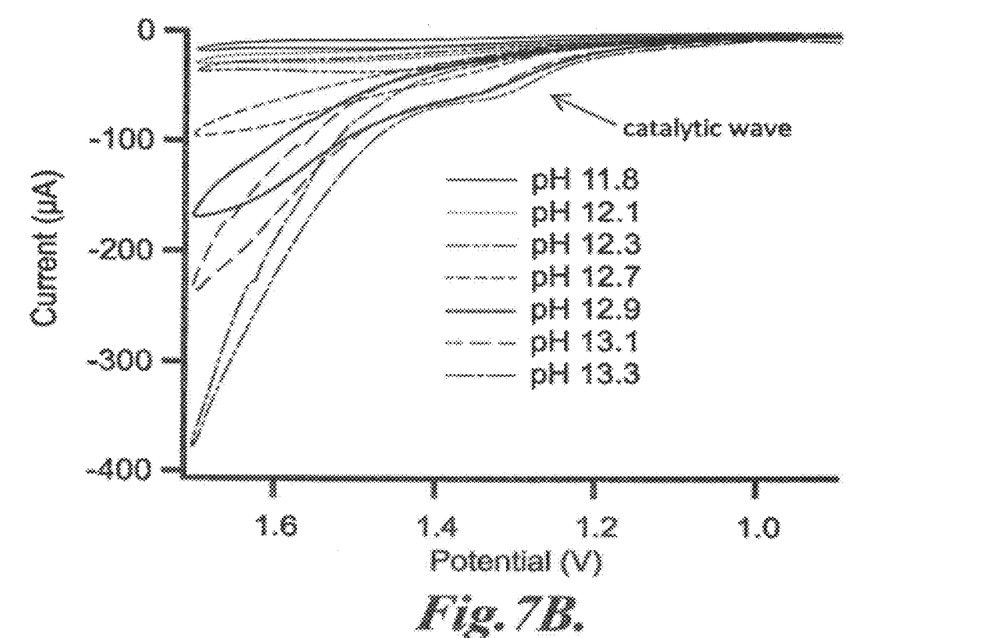
FIGS. 7B and 7C are CVs of 50 μM [(bpy)Cu(μOH)]$_2$ (OAc)$_2$ at various pH levels (FIG. 7B) and the background currents under the same conditions (FIG. 7C). The background currents were collected in the same electrolyte solution without the presence of copper. All CVs were collected at 3 mV/s in 0.1 M electrolyte (NaOAc+NaOH) with the following electrodes: working, glassy carbon; reference, Ag/AgCl (adjusted to NHE); auxiliary, Pt.
Figure 7C:
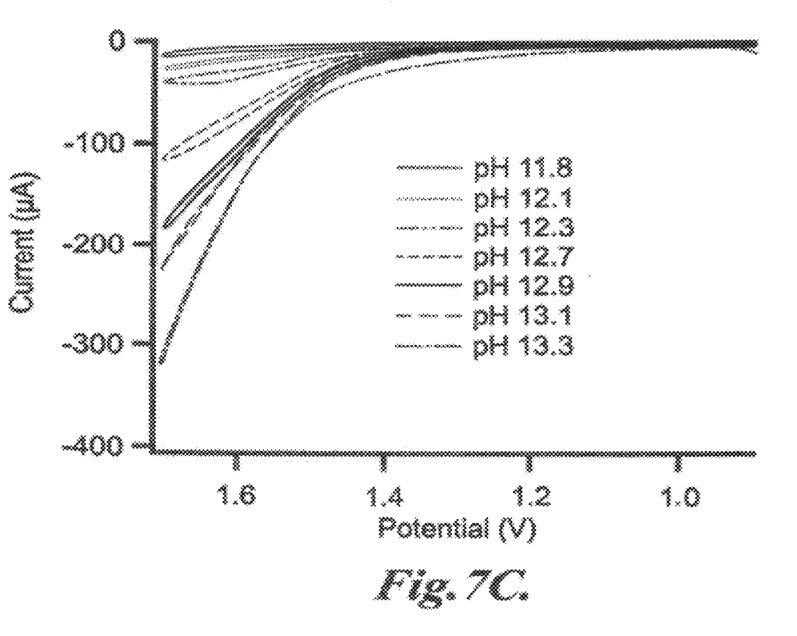

The CVs of [(bpy)Cu(t-OH)]$_2$(OAc)$_2$ at low concentrations (10-100 μM) and slow scan rates (1-5 mV s$^{-1}$) follow Equations 4 and 5. FIG. 7A shows background-corrected CVs collected under these conditions at various pHs. The correction involves subtracting the currents observed obtained in the absence of copper, which at the high pH and low concentration limits are as much as 30% of the total current at 1.3 V (non-corrected CVs and backgrounds are shown in FIGS. 7B and 7C, respectively). Under these conditions, the measured i$_c$ proportional to the catalyst concentration and independent of scan rate, as expected from Equation 4. Using the Cu$^{III/I}$ reductive couple (FIG. 2A inset) as an estimate of $i_p$, and assuming that $n_c=4$ and $n_R=1$, Equation 5 gives a turnover frequency (TOF) of $100\ s^{-1}$.

Figure 8A:
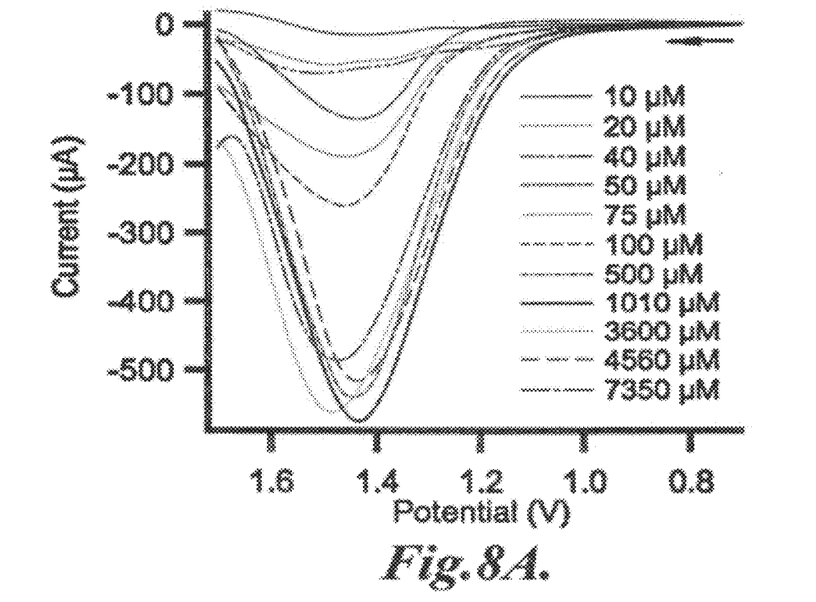
FIG. 8A is a CVs of [(bpy)Cu(μ-OH)]$_2$(OAc)$_2$ at various concentrations. All CVs were collected on GC at 50 mV/s and pH 12.5 in 0.1 M electrolyte (NaOAc+NaOH). Returning currents are removed for clarity.
Figure 8B:
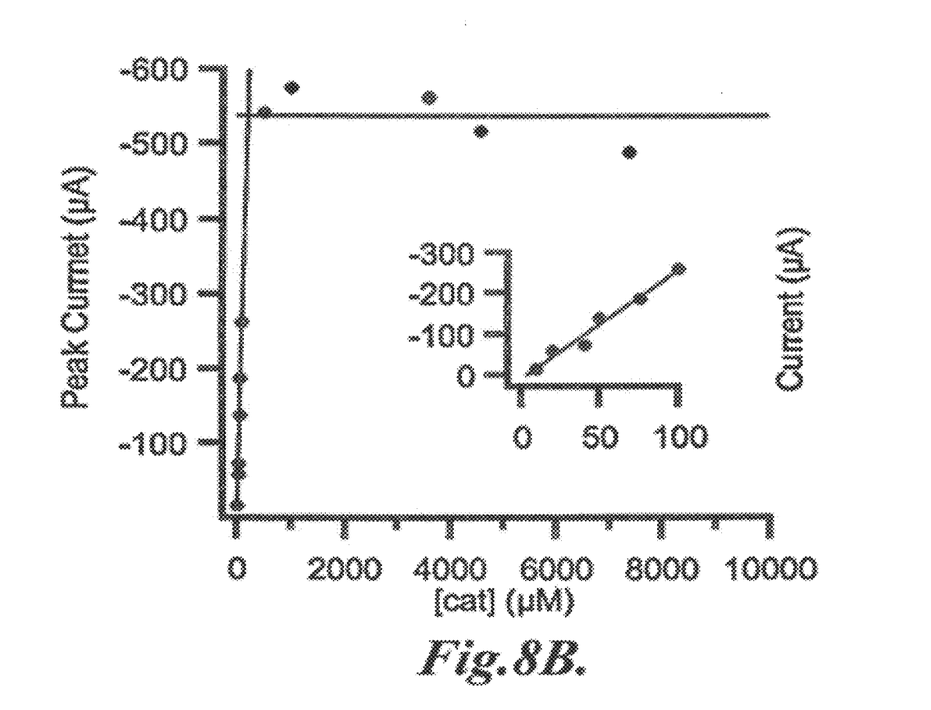
FIG. 8B illustrates that, at 100 μM and below, the peak current is linearly proportional to catalyst concentration. At concentrations 500 μM and above, the peak current stays roughly the same.

At higher catalyst concentrations (>0.1 mM) and at faster scan rates (10-1,000 mV/s), the CVs have a well-defined peak (FIGS. 2A-2C). This shows that the system is not under pure kinetic control, and indicates that the currents are limited in part by diffusion of substrate—hydroxide— to the electrode surface. This situation has been discussed for other water oxidation catalysts and is very reasonable given the fast catalysis (~100 turnover $s^{-1}$). At 0.5 mM [(bpy)Cu(µ-OH)]$_2^{2+}$ and pH 12.5, the concentration of hydroxide is only 63 times larger than the catalyst concentration, four OH— are consumed in each turnover of the catalytic cycle, and it takes multiple seconds to scan through the catalytic wave. Perhaps for this reason, at moderate to high catalyst concentrations (0.5 to 10 mM), $i_c$ is roughly constant with catalyst concentration (e.g., ~500 µA at pH 12.5 and 10 mV/s scan rate) (FIGS. 8A and 8B). A complete kinetic description is complex because as hydroxide is oxidized to $O_2$ and the pH decreases, the speciation of the copper changes, removing the catalyst.

Several pieces of evidence suggest that this copper system is a homogeneous catalytic system rather than a heterogeneous electrocatalytic deposit. No discoloration of the electrodes is observed during cyclic voltammetry or bulk electrolysis, which might have indicated deposition of a copper material. The unusual independence of catalytic current on catalyst concentration (FIGS. 8A and 8B) could be rationalized with a weakly bound surface species. However, similar water oxidation is observed with two different electrode materials (carbon and ITO) and with three different counterions/electrolytes (acetate, sulfate and triflate), which might not be expected for a surface deposit. Similarly, the maximum current does not increase over multiple CVs and the wave shape does not change, as might be expected for a multilayer catalytic deposit. As a further test, a glassy carbon electrode was cycled from 0.2 V to +1.7 V ten times in a solution of [(bpy)Cu(µ-OH)]$_2$(OAc)$_2$ at pH 12.5 with 0.1 M NaOAc. Following these scans, the electrode was rinsed, but not polished. When this electrode was cycled in fresh, copper-free electrolyte at pH 12.5, no catalytic wave was observed. Overall, the data are consistent with a soluble electrocatalyst.

The catalytic TOF of $100\ s^{-1}$ is very fast for water oxidation catalysts. A soluble cobalt electrocatalyst was recently reported with a similar TOF, but values of less than $1\ s^{-1}$ are more typical for the well-studied ruthenium catalysts. The very rapid rates found for the copper system may be due to its utilizing the biomimetic catalytic cycle in FIG. 1, in which O—O bond formation is likely to be facile. Mechanistic studies have yet to be performed, but the pH dependence of the catalysis appears to be consistent with the pt-hydroxide dimer being important in the catalytic cycle. Some have suggested that [(bpy)Cu(µ-OH)]$_2^{2+}$ is the dominant species in solution at pH≥12 with [Cu]total=3-6 mM, the region where electrocatalysis is observed. It should be noted, however, that others have reached somewhat different descriptions of the aqueous speciation of Cu/bpy solutions.

In conclusion, disclosed here are the first examples of homogeneous copper electrocatalysts for water oxidation. The addition of copper to the known manganese, cobalt, and iron systems is a significant advance in soluble 'earth abundant' and inexpensive first-row transition metals catalysts for the challenge of water oxidation. The [(bpy)Cu([µ-OH)]$_2^{2+}$ compounds self-assemble from inexpensive components in aqueous solutions and appear to be fairly robust.

While illustrative embodiments have been illustrated and described, it will be appreciated that various changes can be made therein without departing from the spirit and scope of the invention.

The embodiments of the invention in which an exclusive property or privilege is claimed are defined as follows:

1. An electrocatalytic method for oxidizing water to provide oxygen gas, comprising applying a voltage across an anode and a cathode submerged in a solution comprising:
    (a) water at a pH of 8 or greater; and
    (b) an electrocatalyst comprising a cation:

[Cu$_2$(µ-OH)$_2$(L)$_2$]$^{2+}$ wherein Cu is copper in a +2 oxidation state;
    wherein µ-OH is an oxide ligand bridging the Cu$_2$;
    wherein L is a polydentate nitrogen ligand bound to the Cu; and
    (c) one or more anions X, wherein the total charge of the one or more anions X is −2.

2. The method of claim 1, wherein the electrocatalyst is provided by combining water with a complex:

[Cu$_2$(µ-OH)$_2$(L)$_2$]X wherein the one or more anions X render the complex soluble in water to at least 1 micromolar concentration.

3. The method of claim 1, wherein X is selected from the group consisting of acetate, triflate, sulfate, nitrate, tetrafluoroborate, and hexafluorophosphate.

4. The method of claim 1, wherein L is selected from the group consisting of 1,10-phenanthroline, 2,2'-dipyridyl methane, 2,2'-dipyridyl amine, 2,2,2"-tripyridyl amine, tris (2-pyridylmethyl)amine, ethylenediamine, diethylenediamine, EDTA (ethylene diamine tetracetic acid), 2,2'-bipyridine ligands, and 4,4'-Y$_2$-2,2'-bipyridines, where Y is a carboxyl anion, methyl, t-butyl, or methoxy.

5. The method of claim 1, wherein the cation has a concentration of from 1 micromolar to 1 molar.

6. The method of claim 1, wherein the electrocatalyst is a homogeneous catalyst.

7. The method of claim 1, wherein the electrocatalyst is a solid material derived from the soluble copper cation.

8. The method of claim 1, wherein the electrocatalytic oxidation of water has an overpotential that is less than if no electrocatalyst is present in the solution.

9. An electrocatalytic method for oxidizing water to provide oxygen gas, comprising applying a voltage across an anode and a cathode submerged in a solution comprising Cu(II)X and L in water at a pH of 8 or greater, to provide an electrocatalytic solution, wherein X is one or more anions having a the total charge of −2.

10. The method of claim 9, wherein the molar ratio of Cu(II)X to L is about 1 to 1.

11. The method of claim 9 wherein X is selected from the group consisting of acetate, triflate, sulfate, nitrate, tetrafluoroborate, and hexafluorophosphate.

12. The method of claim 9 wherein L is selected from the group consisting of 1,10-phenanthroline, 2,2'-dipyridyl methane, 2,2'-dipyridyl amine, 2,2,2"-tripyridyl amine, tris (2-pyridylmethyl)amine, ethylenediamine, diethylenediamine, EDTA (ethylene diamine tetracetic acid), 2,2'-bipyridine ligands, and 4,4'-Y$_2$-2,2'-bipyridines, where Y is a carboxyl anion, methyl, t-butyl, or methoxy.

13. The method of claim 9 wherein the electrocatalytic oxidation of water has an overpotential that is less than if no electrocatalytic solution is present.

* * * * *

UNITED STATES PATENT AND TRADEMARK OFFICE
CERTIFICATE OF CORRECTION

PATENT NO. : 8,585,888 B2  
APPLICATION NO. : 13/281292  
DATED : November 19, 2013  
INVENTOR(S) : Mayer et al.

Page 1 of 1

It is certified that error appears in the above-identified patent and that said Letters Patent is hereby corrected as shown below:

In the Claims

| COLUMN | LINE | |
|---|---|---|
| 12 | 50 | "having a the total" should read |
| Claim 9 | | --having a total-- |

Signed and Sealed this
Twenty-second Day of July, 2014

Michelle K. Lee
*Deputy Director of the United States Patent and Trademark Office*